United States Patent
Griffin (10) Patent No.: US 8,098,232 B2
(45) Date of Patent: Jan. 17, 2012

(54) TOUCH SENSITIVE DISPLAY HAVING TACTILE STRUCTURES

(75) Inventor: Jason Griffin, Kitchener (CA)

(73) Assignee: Research In Motion Limited, Waterloo, Ontario ( * ) Notice: Subject to any disclaimer, the term of this patent is extended or adjusted under 35 U.S.C. 154(b) by 1315 days.

(21) Appl. No.: 11/468,505

(22) Filed: Aug. 30, 2006

(65) Prior Publication Data

US 2008/0055255 A1 Mar. 6, 2008

(51) Int. Cl.
 *G06F 3/041* (2006.01)
(52) U.S. Cl. ......... 345/173; 345/156; 715/701; 715/702
(58) Field of Classification Search ................ 345/156, 345/173; 715/701, 702
 See application file for complete search history.

(56) References Cited

U.S. PATENT DOCUMENTS

| | | | |
|---|---|---|---|
| 4,323,740 A * | 4/1982 | Balash ........................... | 200/5 A |
| 4,684,767 A * | 8/1987 | Phalen ........................... | 200/5 A |
| 5,412,189 A | 5/1995 | Cragun | |
| 6,107,997 A * | 8/2000 | Ure ............................... | 345/173 |
| 6,198,475 B1 | 3/2001 | Kunimatsu et al. | |
| 6,259,044 B1 | 7/2001 | Paratore et al. | |
| 6,459,424 B1 | 10/2002 | Resman | |
| 6,492,978 B1 | 12/2002 | Selig et al. | |
| 7,616,192 B2 * | 11/2009 | Schroeder ..................... | 345/173 |
| 2002/0156807 A1* | 10/2002 | Dieberger .................. | 707/501.1 |
| 2003/0081016 A1 | 5/2003 | Rahimzadeh et al. | |
| 2003/0179190 A1 | 9/2003 | Franzen | |
| 2003/0235452 A1 | 12/2003 | Kraus et al. | |
| 2004/0056877 A1* | 3/2004 | Nakajima .................... | 345/702 |
| 2004/0090428 A1 | 5/2004 | Crandall, Jr. et al. | |
| 2004/0252109 A1 | 12/2004 | Trent, Jr. et al. | |
| 2005/0057528 A1 | 3/2005 | Kleen | |
| 2005/0099403 A1* | 5/2005 | Kraus et al. .................. | 345/173 |
| 2006/0033723 A1 | 2/2006 | Maw | |
| 2006/0265648 A1 | 11/2006 | Rainisto et al. | |
| 2006/0274051 A1* | 12/2006 | Longe et al. .................. | 345/173 |
| 2007/0085838 A1 | 4/2007 | Ricks et al. | |
| 2007/0103447 A1* | 5/2007 | Varian et al. ................. | 345/173 |
| 2007/0152975 A1 | 7/2007 | Ogihara et al. | |
| 2007/0165006 A1 | 7/2007 | Sato et al. | |
| 2007/0279391 A1 | 12/2007 | Marttila et al. | |

FOREIGN PATENT DOCUMENTS

| | | |
|---|---|---|
| CN | 1955904 | 5/2007 |
| EP | 1548544 | 6/2005 |
| EP | 1621989 | 2/2006 |
| WO | 03/025886 A | 3/2003 |

(Continued)

OTHER PUBLICATIONS

European Patent Office, EP Communication issued for EP application 06119775.2, Dec. 27, 2006, 6 pages.

(Continued)

*Primary Examiner* — Amare Mengistu
*Assistant Examiner* — Insa Sadio
(74) *Attorney, Agent, or Firm* — Hanley, Flight & Zimmerman, LLC.

(57) ABSTRACT

An improved handheld electronic device has a touch sensitive display which comprises a number of elongated tactile structures that are haptically detectable by a user. Various routines executable on the handheld electronic device can cause visual elements to be output in various predetermined arrangements with respect to the arrangement of the tactile structures in order to facilitate input.

20 Claims, 9 Drawing Sheets

FOREIGN PATENT DOCUMENTS

WO 2005076117 8/2005
WO 2006065252 6/2006

OTHER PUBLICATIONS

European Patent Office, EP Exam Report issued for EP application 06119775.2, Feb. 5, 2009, 4 pages.

European Patent Office, EP Summons to attend oral proceedings issued for EP application 06119775.2, Apr. 22, 2010, 5 pages.

European Patent Office, EP Communication issued for EP application 06119775.2, Oct. 6, 2010, 4 pages.

Canadian Intellectual Property Office, office action issued for CA application 2,599,293, May 17, 2010, 5 pages.

European Patent Office, EP Communication issued in EP application 06119775.2, dated Oct. 8, 2010, 3 pages.

European Patent Office, Decision to Grant EP application 06119775.2, Sep. 1, 2011, 1 page.

* cited by examiner

TOUCH SENSITIVE DISPLAY HAVING TACTILE STRUCTURES

BACKGROUND

1. Field

The disclosed and claimed concept relates generally to handheld electronic devices and, more particularly, to a handheld electronic device having a touch sensitive display that comprises a number of haptically detectable tactile structures.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Some handheld electronic devices have been configured to include a touch sensitive display that both provides visual output and serves as an input device. An actuation of a touch sensitive display, such as by pressing a particular location of the touch sensitive display, provides an input to a processor apparatus of the handheld electronic device. A touch sensitive display typically includes a display portion for providing the visual output and an overlay portion which overlies the display portion and which employs resistive structures, capacitive structures, acoustically-sensitive structures, and/or infrared structures, among other structures, for detecting an actuation of the overlay and to provide input to the processor apparatus.

Touch sensitive displays have not, however, been without limitation. For instance, touch sensitive displays typically provide very little tactile or other feedback to indicate to a user that an actuation has occurred, such as might be provided by a mechanical keyboard or other keyboard. The lack of tactile or other feedback to a user who is attempting to actuate a touch sensitive display results in the user typically having to expend a relatively greater amount of attention in actuating the touch sensitive display, which is undesirable. It thus would be desirable to provide an improved touch sensitive display and handheld electronic device that overcome these and other limitations.

BRIEF DESCRIPTION OF THE DRAWING

A further understanding of the disclosed and claimed concept can be obtained from the following Description when read in conjunction with the accompanying drawings in which:

Similar numerals refer to similar parts throughout the specification.

DESCRIPTION

Figure 1:
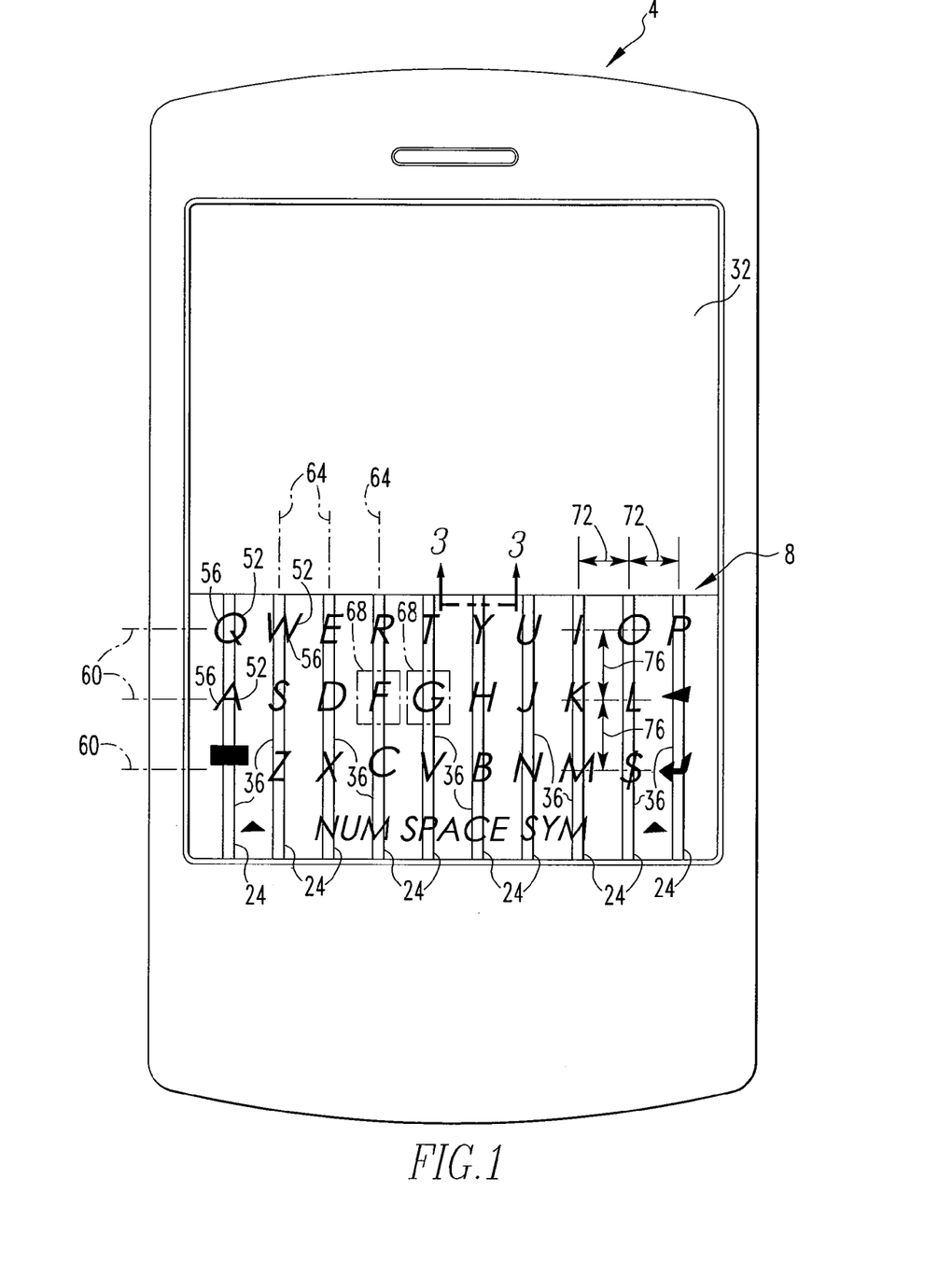
FIG. 1 is a front elevational view of an exemplary improved handheld electronic device in accordance with a first embodiment of the disclosed and claimed concept.
Figure 2:
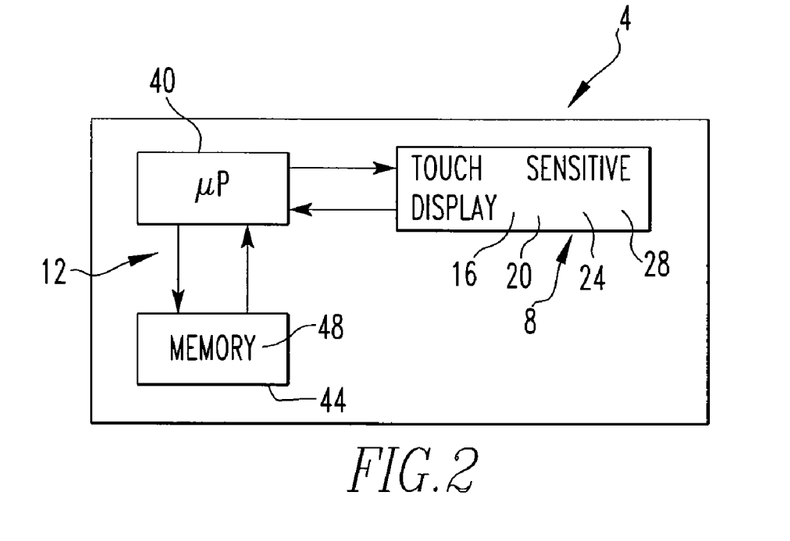
FIG. 2 is a schematic depiction of the handheld device of FIG. 1.
Figure 4:
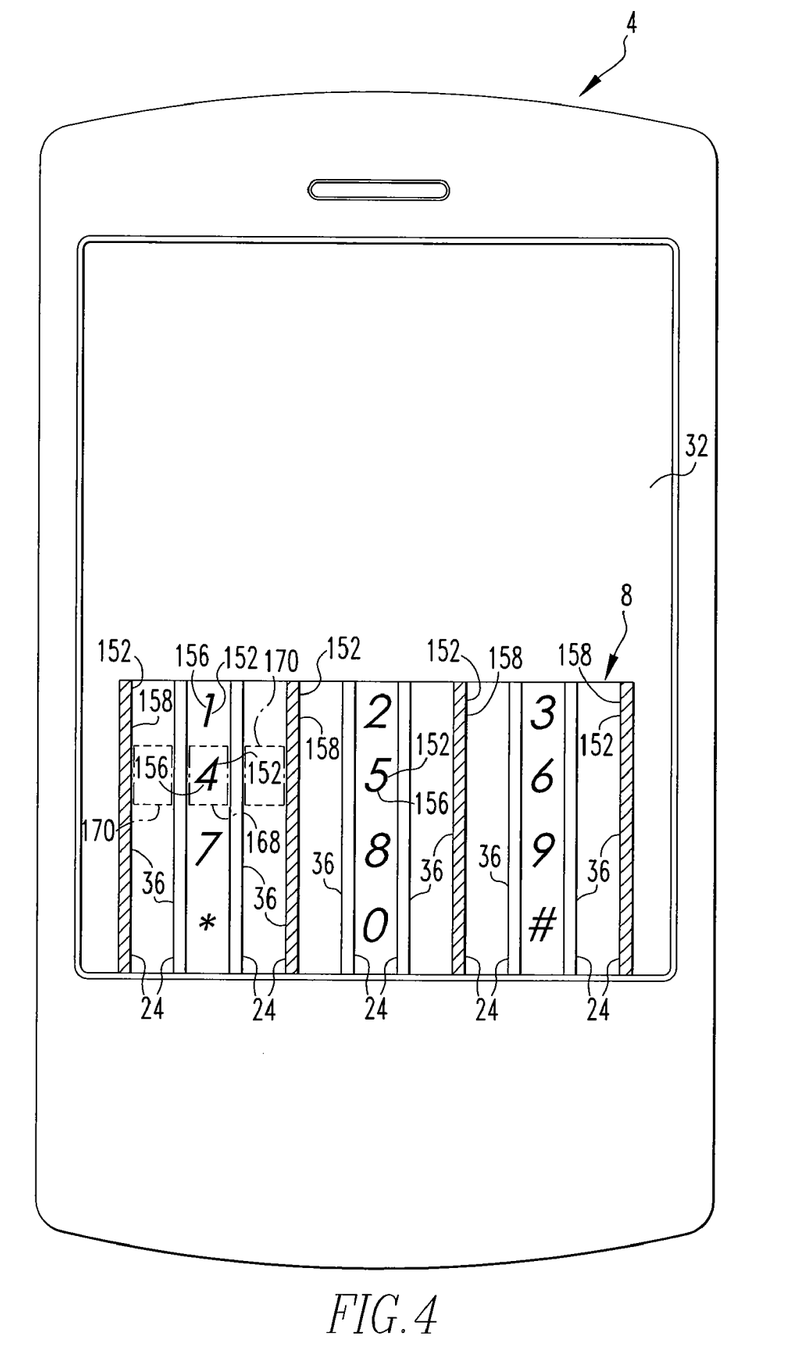
FIG. 4 is a front elevational view of the handheld electronic device of FIG. 1, except depicting a different output than is depicted in FIG. 1.
Figure 5:
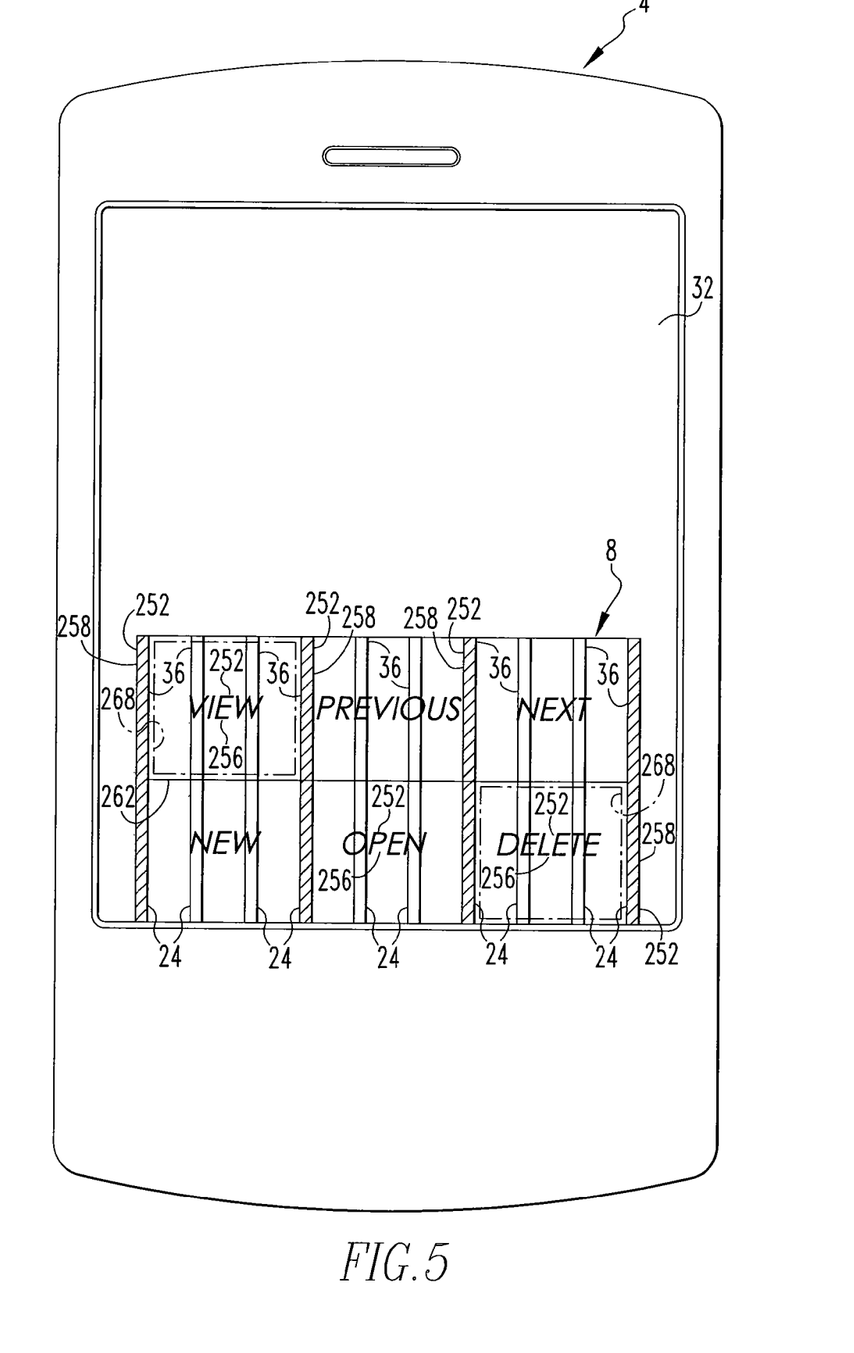
FIG. 5 is a front elevational view of the handheld electronic device of FIG. 1, except depicting a different output than is depicted in FIG. 1.

An improved handheld electronic device 4 in accordance with the disclosed and claimed concept is depicted in FIGS. 1, 4, and 5 and is depicted schematically in FIG. 2. The exemplary handheld electronic device 4 comprises a touch sensitive display 8 and a processor apparatus 12 operatively connected together. As will be set forth in greater detail below, the touch sensitive display 8 provides input signals to the processor apparatus 12 and is responsive to output signals from the processor apparatus 12 to provide visual output. Also, the touch sensitive display 8 advantageously provides tactile feedback to a user.

The touch sensitive display 8 comprises a visual output portion 16, and input portion 20, and an overlay 28 comprising a base 30 and a plurality of tactile structures 24 disposed on the base 30. The overlay 28 is formed of a translucent material and overlies the visual output portion 16. As employed herein, the expression "translucent" and variations thereof shall refer broadly to a quality that permits the passage of visible light or other electromagnetic radiation and may include a transparent quality wherein visible light is transmitted without appreciable scattering so that it does not meaningfully alter light waves traveling therethrough. The input portion 20 is in the form of a number of sensors or other structures that detect actuations of the overlay 28, such as through deflection of the overlay 28, although other touch sensitive display technologies may be employed without departing from the disclosed and claimed concept. It is noted that overlay 28 typically would be considered to be a part of the input portion 20.

The tactile structures 24 are elongated in a direction of elongation that is substantially parallel with a plane of the overlay 28. In cross section, as can be seen from FIG. 3, the tactile structures 24 are protuberances that protrude outwardly from an outer surface 32 of the touch sensitive display 8 in a direction generally away from the visual output portion 16.

The elongated tactile structures 24 each include a number of tactile elements 36. In the depicted exemplary embodiment, each tactile structure 24 includes a single elongated tactile element 36 that is elongated in the direction of elongation of the tactile structure 24. In other embodiments, not expressly depicted herein, a tactile structure 24 could comprise a plurality of tactile elements, whether or not elongated, and that are disposed adjacent one another along the direction of elongation of the tactile structure 24.

Figure 3:
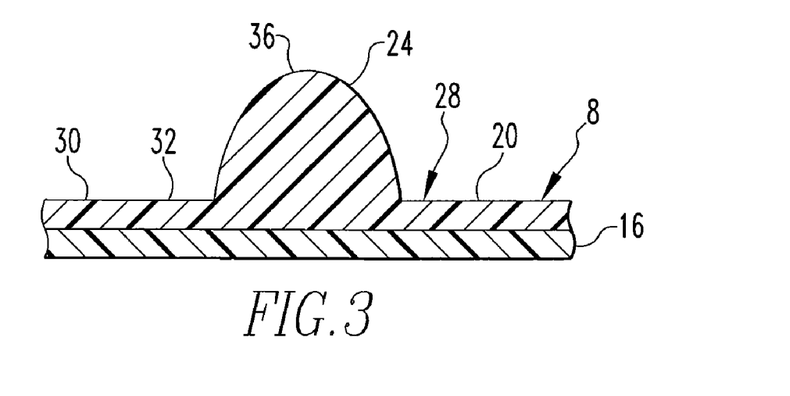
FIG. 3 is a sectional view as taken along Line 3-3 of FIG. 1.

As can be seen in FIG. 3, the tactile elements 36 are of a generally rounded cross section, although other cross sections such as polygonal cross sections or other cross sections can be employed without departing from the disclosed and claimed concept. The exemplary tactile elements 36 have a height in the range of about 0.5-0.6 millimeters, and have a width in the range of about 0.8 millimeters, although other proportions and sizes may be employed without departing from the disclosed and claimed concept. The expressions "height", "width", "horizontal", "vertical", and the like are employed herein without any intention to imply a limitation. The tactile structures 24 are themselves translucent.

The processor apparatus 12 comprises a processor 40 and a memory 44. The processor 40 may be, for example and without limitation, a microprocessor (μP), and it interfaces with the memory 44. The memory 44 can be any one or more of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory.

The memory 44 has a number of routines 48 stored therein that are executable on the processor 40. Some of the routines 48 are executable on the processor 40 to result in the processor 40 providing output signals to the visual output portion 16. The exemplary routine 48 being executed in FIG. 1 caused the visual output portions 60 to display as a visual output a number of visual elements 52 which, in the exemplary output depicted in FIG. 1, comprise a plurality of Latin characters 56, among other symbols. The Latin characters 56 are arranged in a plurality of rows 60 and a plurality of columns 64 in an exemplary QWERTY arrangement. The exemplary rows 60 are horizontally oriented in FIG. 1, and the exemplary columns 64 are vertically oriented, although other arrangements are possible.

As can be understood from FIG. 1, the visual elements 52 have been output in a particular arrangement with respect to the placement of the tactile structures 24 and, in particular, are arranged such that the tactile structures 24 overlie the columns 64 of the Latin characters 56. When a user is seeking to actuate the touch sensitive display 8, such as to enter the Latin character 56 "F", the user would press the touch sensitive display 8 within a schematically-depicted input zone 68 of the touch sensitive display 8. This would result in, for example, an input by the input portion 20 to the processor 40 which might interpret the input as an entry of the character "F". The exemplary input zone 68 extends from locations spaced from alternate sides of the tactile structure 24 that overlies the Latin character 56 "F" that is provided as a visual element 52, and all of the visual elements 52 similarly have at least one input zone. For purposes of simplicity, the exemplary input zone 68 is depicted herein as being a region of the overlay 28, it being understood that such region, when actuated, will result in the input portion 20 providing to the processor 40 a signal indicative of an actuation of the particular visual element 52.

When a user actuates the input zone 68, or any other input zone, such as by manually pressing the touch sensitive display 8, the tactile structure 24 can be haptically detected by the user to provide tactile feedback indicating that the actuation was made at the desired location, i.e., substantially above the visual element 52 "F", rather than in a zone between the visual element 52 "F" and an adjacent visual element 52. That is, the tactile structures 24 typically provide tactile feedback to a user during touching of the touch sensitive display 8, such as immediately prior to the actuation, during the actuation, and subsequent to the actuation but prior to a user's finger being removed from the touch sensitive display 8. A user haptically detecting the tactile structure 24 during an actuation of an input zone 68 can advantageously expend relatively less attention than would otherwise be required in the absence of the tactile structures 24 in ensuring that the actuation occurred at the desired location. This is due, at least in part, to the tactile structures 24 providing haptic reinforcement that the correct actuation was made. As employed herein, the expression "haptic" and variations thereof shall refer broadly to a situation related to or based upon the sense of touch.

In the depicted exemplary embodiment, the tactile structures 24 are elongated and are oriented in a direction generally parallel with the orientation of the columns 64. The orientation of the tactile structures 24 generally parallel with the columns 64 is particularly advantageous because the columns 64 are of a closer pitch than the rows 60. That is, the horizontal spacing between adjacent columns 64, as is indicated by the first lines 72 of FIG. 1, is relatively smaller, i.e., tighter, i.e., the columns 64 are positioned closer to one another, than the vertical spacing of the rows 64, as is indicated by the second lines 76 of FIG. 1. Since the pitch of the Latin characters 56 in the horizontal direction from the perspective of FIG. 1 is tighter than the pitch thereof in the vertical direction from the perspective of FIG. 1, the tactile structures 24 are vertically oriented and horizontally spaced apart from one another. Such an arrangement advantageously enables a user to haptically resolve the relatively close horizontal positioning of the various visual elements 52, which facilitates input. It is understood that in other embodiments, not expressly depicted herein, the tactile structures could be in other orientations that may correspond with the relative closeness of the pitch of certain visual elements without departing from the disclosed and claimed concept.

As can be understood from FIG. 4, a different routine 48 than that being executed in FIG. 1 can result in an output different than that of FIG. 1. For instance, the routine 48 being executed in FIG. 4 might be, for instance, a telephone routine since the visual elements 152 comprise digits 156 and other symbols arranged in a touch-tone telephone configuration. By way of further example, the output of FIG. 1 might result when the routine 48 being executed in FIG. 1 is a text input routine.

As can be understood from FIG. 4, the visual elements 152 further comprise a plurality of elongated bars 158 that are each coincident with one of the tactile structures 24. As can be understood from FIG. 4, however, fewer than all of the tactile structures 24 have a bar 158 output coincident thereto. For instance, each pair of adjacent bars 158 has disposed therebetween a pair of tactile structures 24 that do not have bars 158 coincident therewith.

In the exemplary depicted embodiment, each of the digits 156 and other symbols have an active input zone 168 extending generally between the tactile structures 24 adjacent thereto that do not have bars 158 coincident therewith. As such, an actuation of such an active input zone 168 will be detected by the processor 40 as being a valid input of the particular digit 156 or other symbol. Moreover, the touch sensitive display 8 has a pair of null input zones 170 disposed at alternate sides of each active input zone 168, with each null input zone 170 extending between a bar 158 and one of the tactile structures 28 that does not have a bar coincident therewith.

In the embodiment depicted generally in FIG. 4, the bars 158 serve to visually break up the touch sensitive display 8 into a conventional touch-tone telephone pad having the digits 156 and other symbols being output in the typically touch-tone telephone arrangement. The active input zones 168 each extend between an adjacent pair of the tactile structures 24 in order to provide an enhanced level of tactile feedback to a user. For instance, when the telephone routine 48 is being executed on the processor 40, a user will know that a valid input has been made if the user haptically detects two tactile structures 24 at alternate ends of the location where an actuation of the touch sensitive display 8 was made. The null input zones 170 are provided in order to allow the processor 40 to ignore certain inputs, such as inputs that potentially could be erroneous inputs by the user. In other embodiments, not expressly depicted herein, all of the input zones could be active zones 168, thereby providing to the user relatively larger input zones, the actuation of which will provide a valid input to the processor 40.

When, for example, the processor 40 goes from executing the text input routine 48 of FIG. 1 to executing the telephone routine 48 of FIG. 4, the telephone routine 48 advantageously reconfigures the touch sensitive display 8 to, for example, change the visual elements 52 and the arrangement thereof in FIG. 1 into the visual elements 152 and the arrangement thereof in FIG. 2. The telephone routine 48 also advantageously reconfigures the touch sensitive display 8 such that the input zones 68 are reconfigured into the active input zones 168, whether or not additionally including the null input zones 170.

FIG. 5 depicts the handheld electronic device 4 when another routine 48 is being executed on the processor 40. The output signals generated by the processor 40 during execution of the routine 48 of FIG. 5 cause the visual output portion 60 to provide as an output a plurality of visual elements 252 in the form of buttons 256 that are, for example, of particular relevance to the routine 48 being executed. In the exemplary output of FIG. 5, the visual elements 252 additionally include a number of bars 258, each of which is coincident with one of the tactile structures 24, and further comprise a division line 262 that is oriented perpendicular to the bars 258 and can be optionally provided to further distinguish the buttons in one row 260 from the buttons in another row 260. The routine 48 being executed in FIG. 5 reconfigures the touch sensitive display 8 to have, for example, a plurality of input zones 268 each bounded by a pair of the bars 258 and the division line 262. An actuation of the touch sensitive display 8 anywhere within a particular input zone 268 will result in the processor 40 detecting a valid input of the button 256 that is visually depicted as a visual element 252 in the actuated input zone 268. It also can be seen that the visual elements 252 depict at least some of the exemplary buttons 256 as extending across a plurality of the tactile elements 24 within a given input zone 268. Here also, the tactile structures 24 facilitate input by providing tactile feedback to a user during actuation of the touch sensitive display 8.

It thus can be seen that the tactile structures 24 that are haptically detectable by a user help the user to haptically distinguish one visual element from another, which facilitates input. Moreover, the various routines 48 executable on the processor 40 can cause the various visual elements to be output in predetermined arrangements with respect to the arrangement of the tactile structures 24 in order to meet various needs. For instance, one need might be to distinguish one visual element from another in an environment of a close pitch between adjacent visual elements, such as is indicated generally in FIG. 1. The tactile structures 24 can be supplemented with visual elements in the form of bars, for example, that may be coincident with certain of the tactile structures 24 in order to further differentiate certain regions of the touch sensitive display 8, such as for the purpose of eliminating errors and/or for the purpose of providing enlarged input zones, all of which facilitate input.

Figure 6:
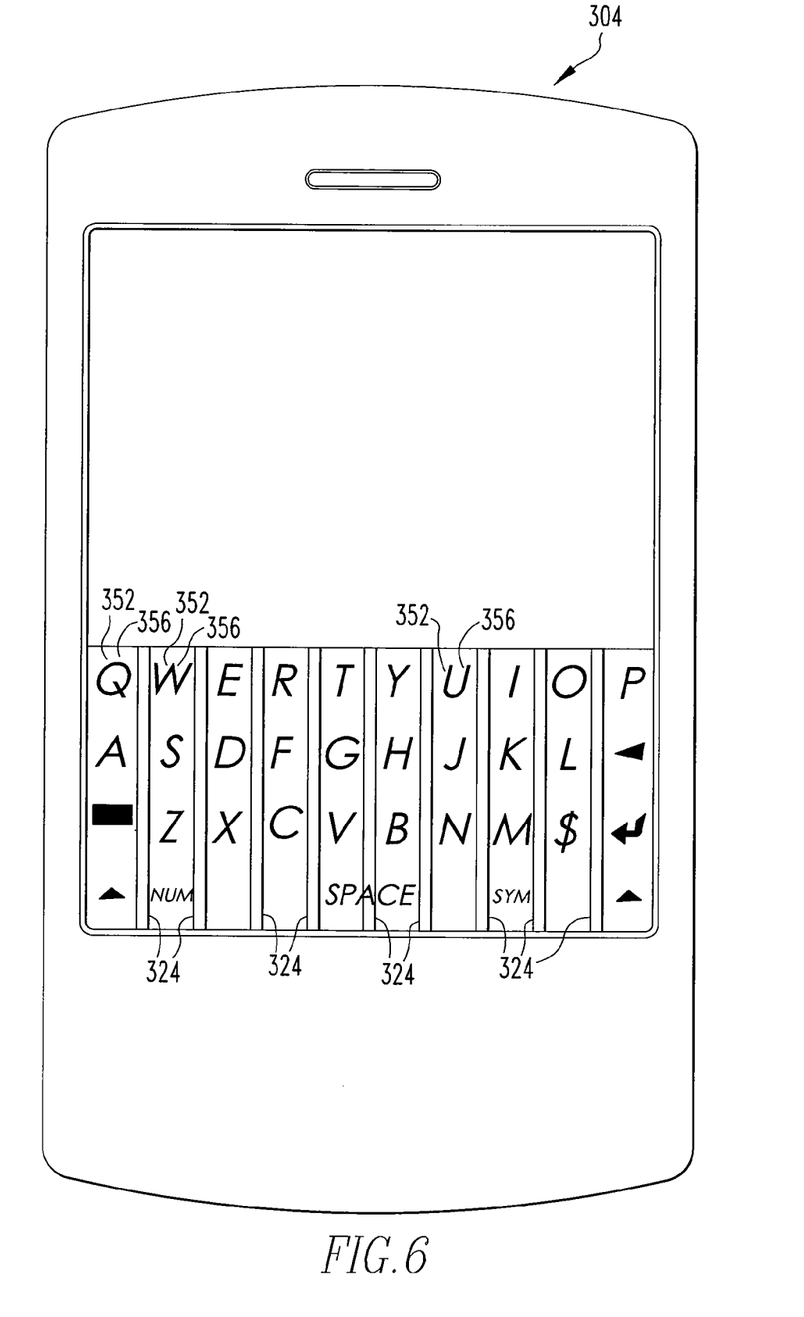
FIG. 6 is a front elevational view of an exemplary improved handheld electronic device in accordance with a second embodiment of the disclosed and claimed concept.
Figure 7:
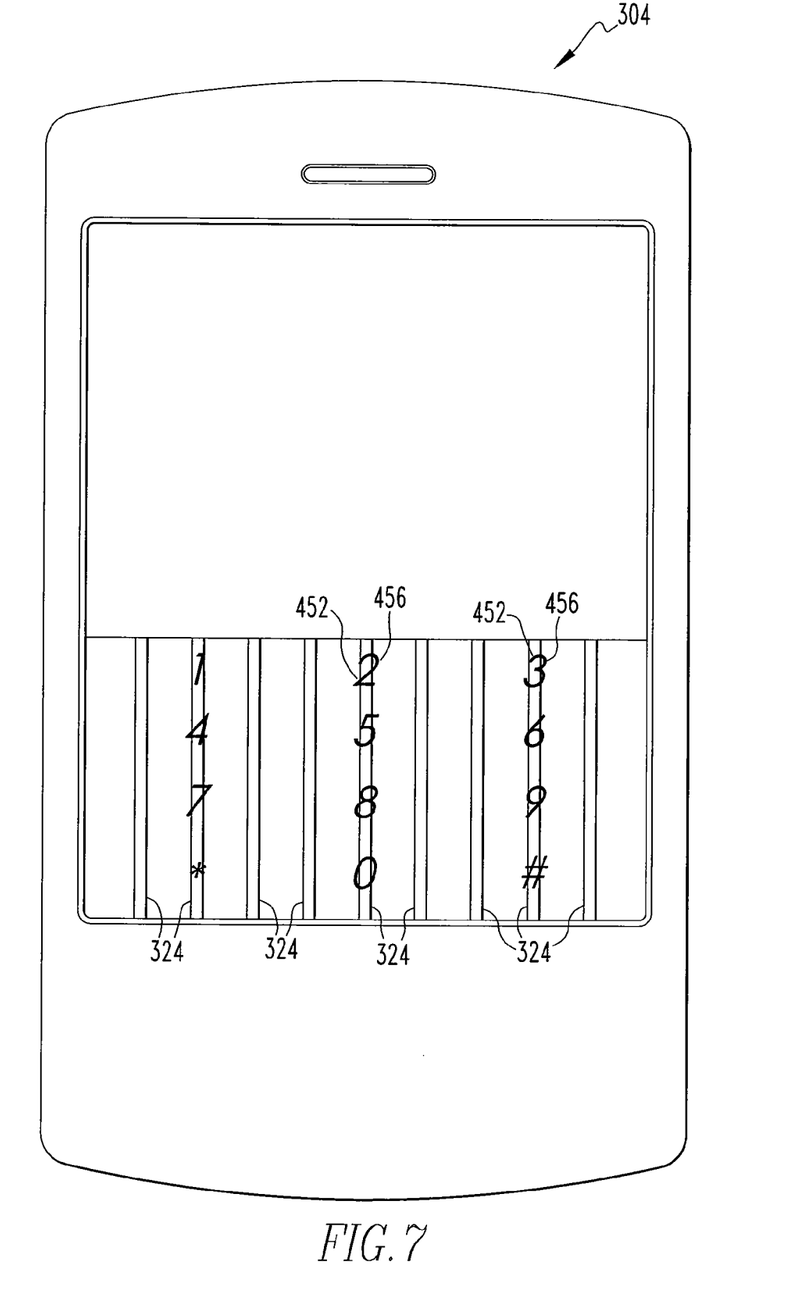
FIG. 7 is a front elevational view of the handheld electronic device of FIG. 6, except depicting a different output than is depicted in FIG. 6.

An improved handheld electronic device 304 in accordance with a second embodiment of the disclosed and claimed concept is depicted generally in FIGS. 6 and 7. The handheld electronic device 304 is similar to the handheld electronic device 4, except that the handheld electronic device 304 of FIG. 6 has nine elongated tactile structures 324 whereas the handheld electronic device 4 has ten. By providing nine tactile structures 324, the visual elements 352, such as when output as Latin characters 356 in a QWERTY arrangement, are disposed adjacent and between the tactile structures 324, rather than having the tactile structures 324 overlying the Latin characters 356. Even though the tactile structures 324 are translucent, they potentially could cause some nominal visual distortion of the Latin characters 356 if the Latin characters 356 were output such that the tactile structures 324 were overlying them. By providing, for instance, nine tactile structures 324 instead of ten, the visual elements 352 output as Latin characters 356 in a QWERTY arrangement can be disposed adjacent and/or between the tactile structures 324, rather than having the tactile structures 324 overlying and possibly visually distorting the Latin characters 356.

FIG. 7 depicts an exemplary additional output on the handheld electronic device 304, such as would be provided when a touch-tone telephone routine 48 is executed on the handheld electronic device 304 and outputs as visual elements 452 a number of digits 456 and symbols in a touch-tone telephone configuration. In the exemplary output of FIG. 7, the tactile structures 324 overlie the digits 456. Even though the tactile structures are, as mentioned above, translucent, and potentially could cause some visual distortion of the visual elements 452 when overlying the visual elements 452, such distortion is at most of an extremely minimal nature. If it is assumed that a text input routine 48 is executed on the handheld electronic device 304 with greater frequency than the touch-tone telephone routine 48, the Latin characters 356 are preferably undistorted since they are needed more often by the user than the digits 456. It is understood, however, that the visual elements 452 of FIG. 7 could, for example, be shifted in a direction perpendicular to the longitudinal extent of the visual elements 352 to thereby position the visual elements 352 such that the tactile structures 324 are disposed adjacent and/or between adjacent ones of the visual elements 352. Such an output, while not expressly depicted herein, would avoid any potential for visual distortion that might be caused by the tactile structures 324, and it is further noted that any of the outputs in any of the embodiments herein can be adjusted in such a fashion as appropriate without departing from the present concept.

Figure 8:
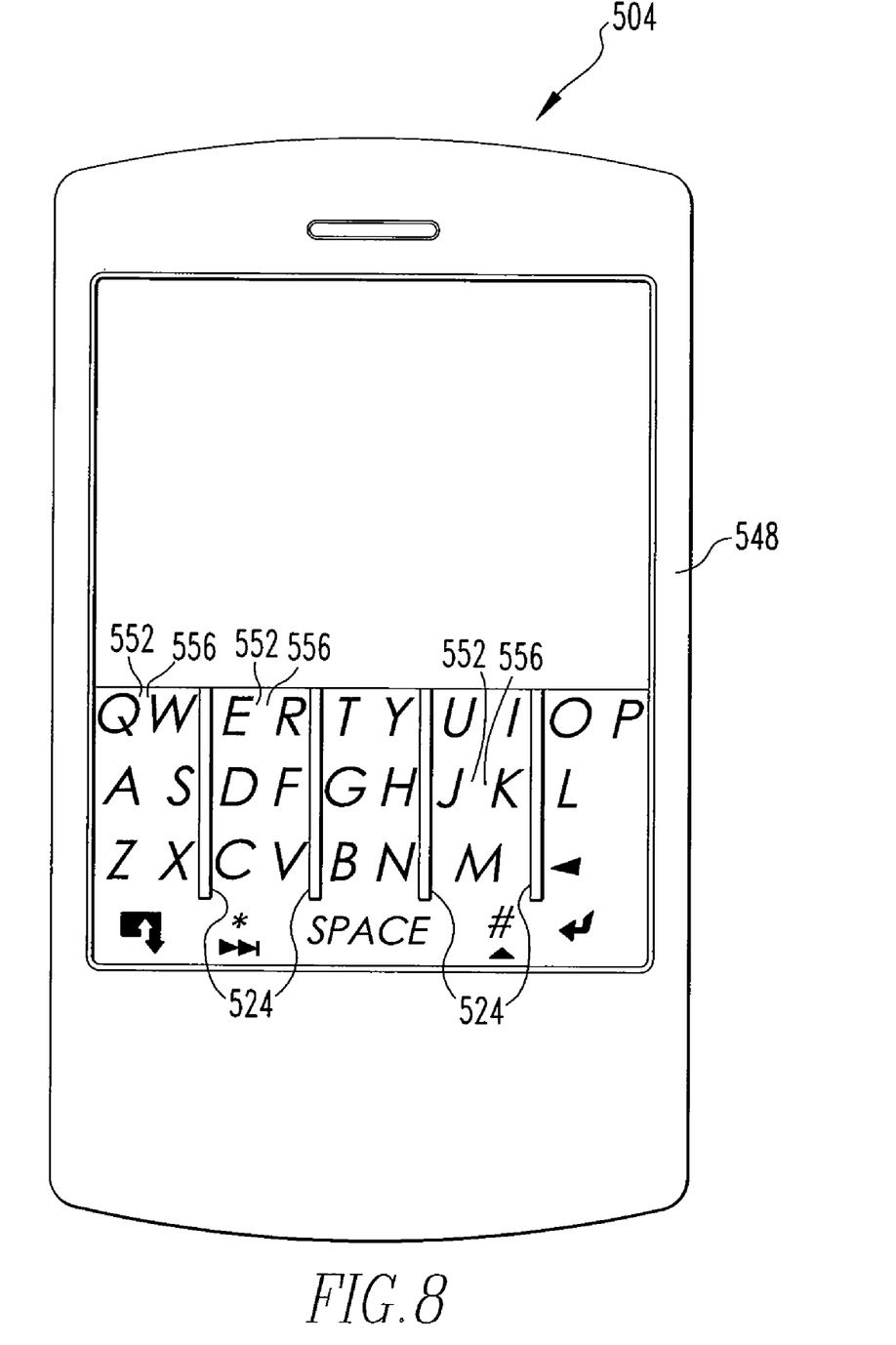
FIG. 8 is a front elevational view of an exemplary improved handheld electronic device in accordance with a third embodiment of the disclosed and claimed concept.
Figure 9:
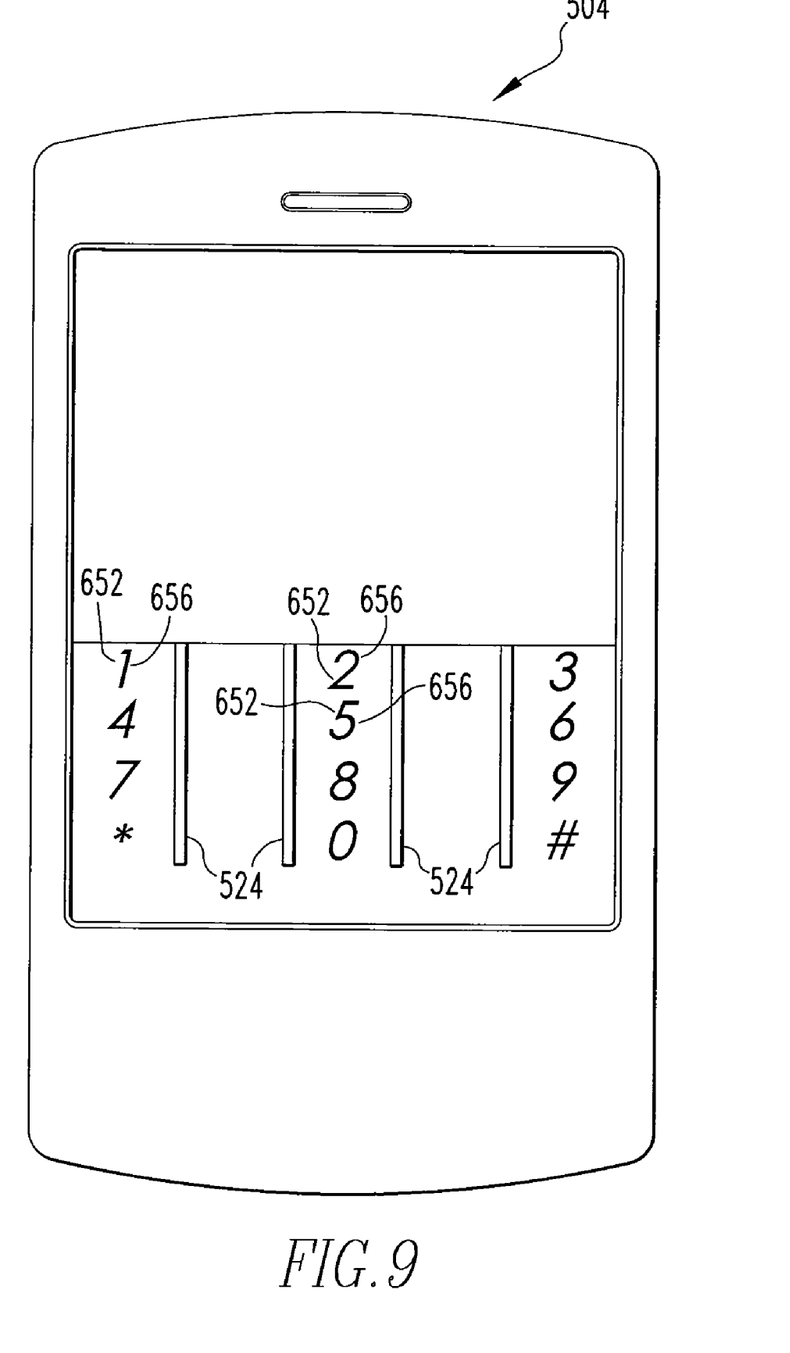
FIG. 9 is a front elevational view of the handheld electronic device of FIG. 8, except depicting a different output than is depicted in FIG. 8.

An improved handheld electronic device 504 in accordance with a third embodiment of the disclosed and claimed concept is depicted generally in FIGS. 8 and 9. The handheld electronic device 504 is similar to the handheld electronic device 4 except that it includes four tactile structures 524. The exemplary visual elements 552 are output as pairs of Latin characters 556, and a text input disambiguation routine 548 is executed on the handheld electronic device 504 in order to disambiguate an ambiguous input comprising a number of actuations of a number of the pairs of Latin characters 556. As can be understood from FIG. 8, each pair of Latin characters 556 is separated from an adjacent pair of Latin characters 556 by one of the tactile structures 524. It is noted for the sake of completeness that some of the visual elements 552 may comprise only a single Latin character, it being further noted than actuation of such a visual element 552 would be an unambiguous input. By providing four of the tactile structures 524, the visual elements 552 can be arranged such that none of the tactile structures 524 overlie any of the pairs of Latin characters 556.

FIG. 9 depicts an exemplary output on the handheld electronic device 504 when, for instance, a touch-tone telephone routine is being executed thereon. The exemplary visual elements 652 of FIG. 9 are in the form of digits 656 and other symbols arranged in a touch-tone telephone configuration.

Since the handheld electronic device 504 has only four of the tactile structures 524, the visual elements 652 can be output such that the tactile structures 524 do not overlie any of the visual elements 652, which serves to logically separate adjacent visual elements 652 in the mind of the user, and avoids any visual distortion of the visual elements 652 that might result from one of the tactile structures 524 overlying one of the visual elements 652.

Figure 10:
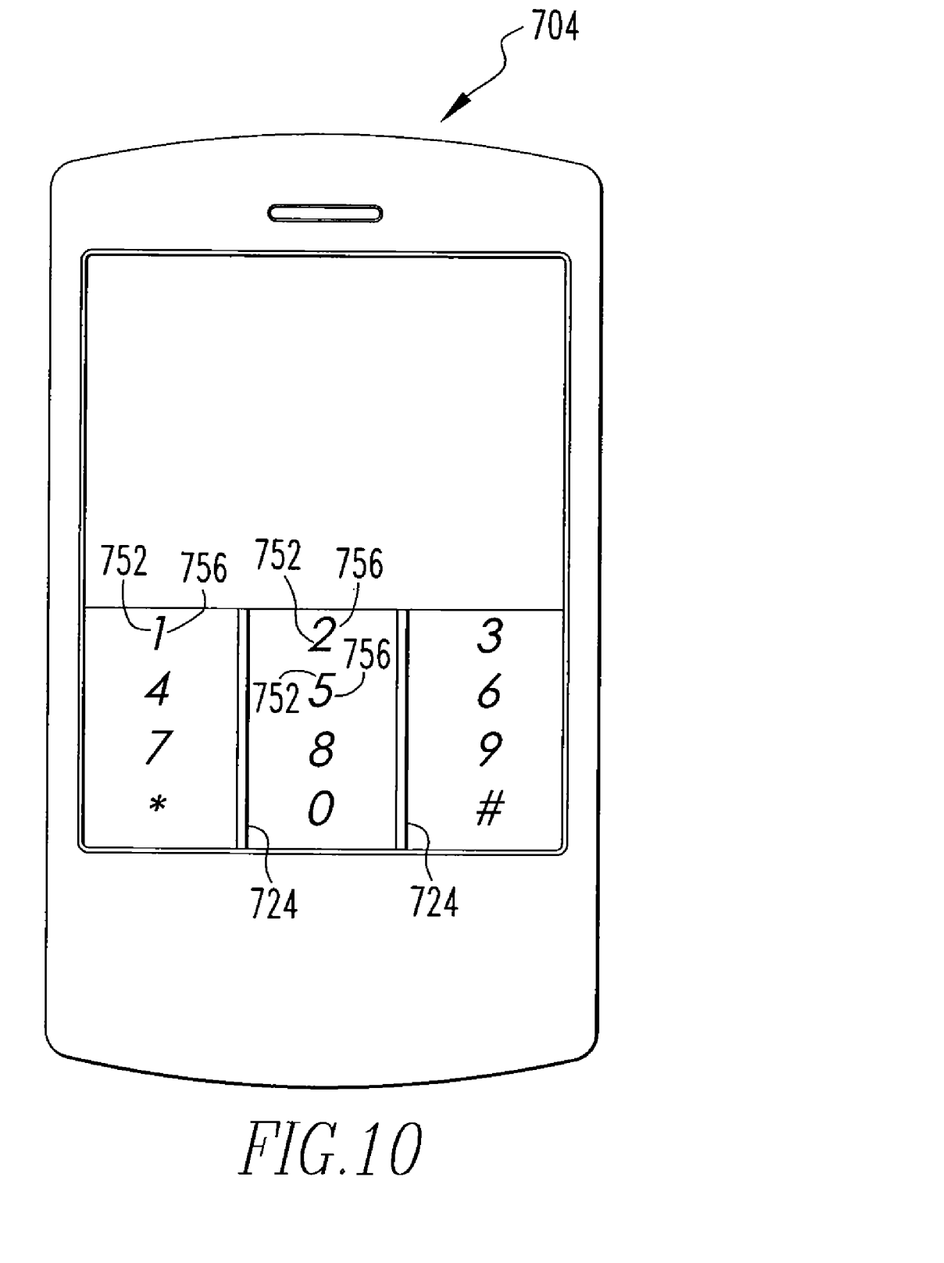
FIG. 10 is a front elevational view of an exemplary improved handheld electronic device in accordance with a fourth embodiment of the disclosed and claimed concept.

An improved handheld electronic device 704 in accordance with a fourth embodiment of the disclosed and claimed concept is depicted generally in FIG. 10. The improved handheld electronic device 704 is similar to the handheld electronic device 4 but has two tactile structures 724. The visual elements 752 are depicted as being digits 756 and symbols in a touch-tone telephone configuration. By providing only two tactile structures 724, the tactile structures 724 do not overlie any of the visual elements 752. The arrangement of the tactile structures 724 might be particularly useful in an environment wherein the handheld electronic device 704 is of a very small form factor, such as if the handheld electronic device 704 were intended primarily to function as a telephone and thus to have a telephone routine executable thereon as a primary application.

In all of the embodiments described herein, the various tactile structures provide tactile feedback to a user and can additionally provide logical separation between adjacent visual elements on the touch-sensitive display of each embodiment of a handheld electronic device. Depending on the particular output of the visual elements, the visual elements might additionally comprise bars, such as might be arranged parallel with the longitudinal extent of the tactile structures, or may be otherwise oriented.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. An electronic device comprising:
a touch sensitive display-structured to provide-visual output and to respond to a touch;
a plurality of tactile structures that are haptically detectable and are on and along an outer surface of the touch sensitive display in an elongated parallel arrangement;
wherein the visual output comprises a plurality of visual elements that are positioned in a predetermined arrangement with respect to placement of the plurality of tactile structures and wherein the plurality of visual elements comprises at least one visual elongated bar displayed below at least one of the tactile structures.

2. The electronic device of claim 1, wherein at least some of the plurality of tactile structures overlie the visual output.

3. The electronic device of claim 1, wherein at least some of the plurality of tactile structures extend away from an outer surface of the touch sensitive display.

4. The electronic device of claim 1, wherein at least some of the plurality of tactile structures are formed of a translucent material.

5. The electronic device of claim 1, wherein at least some of the plurality of tactile structures are protuberances extending away from the outer surface of the touch sensitive display.

6. The electronic device of claim 1, wherein the touch sensitive display comprises a translucent base that is substantially planar, and wherein at least some of the plurality of tactile structures are elongated in a direction generally parallel with the base.

7. The electronic device of claim 1, wherein at least some of the plurality of tactile structures overlie at least some of the plurality of visual elements.

8. The electronic device of claim 1, wherein an input zone extends from locations spaced from alternate sides of a first tactile structure that overlies at least a first visual element.

9. The electronic device of claim 1, wherein at least some of the plurality of visual elements are arranged in a number of rows having one pitch and a number of columns having another pitch.

10. The electronic device of claim 1, wherein at least some of the plurality of tactile structures are disposed between adjacent rows of the plurality of visual elements.

11. The electronic device of claim 1, wherein at least some of the plurality of visual elements are characters of a keyboard disposed in a plurality of rows and a plurality of columns, the columns being arranged such that at least some of the plurality of tactile structures are disposed coincident with at least some of the columns.

12. The electronic device of claim 1, wherein at least some of the plurality of tactile structures comprise a plurality of tactile elements disposed along the direction of elongation of the tactile structure.

13. The electronic device of claim 1, wherein at least some of the plurality of tactile structures are disposed between adjacent columns of the plurality of visual elements.

14. The electronic device of claim 1, wherein the plurality of visual elements comprises at least one elongated bar displayed below at least one of the plurality of tactile structures.

15. The electronic device of claim 1, wherein at least some of the plurality of tactile structures are disposed overlying at least one of a row and a column of the plurality of visual elements.

16. The electronic device of claim 1, wherein a pair of the plurality of tactile structures is disposed parallel with and between a first elongated bar and a second elongated bar of the plurality of visual elements, a first input zone disposed adjacent the first elongated bar, a second input zone disposed adjacent the second elongated bar, and a third input zone being disposed between the pair of tactile structures.

17. The electronic device of claim 16, wherein the first input zone extends between the first elongated bar and the second elongated bar.

18. The electronic device of claim 1, wherein at least some of the plurality of tactile structures are disposed between adjacent visual elements.

19. The electronic device of claim 1, wherein at least some of the plurality of visual elements comprise a pair of characters.

20. An electronic device comprising:
a touch sensitive display-structured to provide-visual output and to respond to a touch;
a plurality of tactile structures that are haptically detectable and are on and along an outer surface of the touch sensitive display in an elongated parallel arrangement;
wherein the visual output comprises a plurality of visual elements that are positioned in a predetermined arrangement with respect to placement of the plurality of tactile structures, wherein a first input zone is disposed between a first tactile structure and a second tactile structure, and wherein a second input zone is disposed partially below a third tactile structure.

* * * * *